United States Patent Office

3,573,062
Patented Mar. 30, 1971

3,573,062
MEAT PRODUCTS
William D. Paynter and Everett V. Podebradsky, Madison, Wis., assignors to Oscar Mayer & Co., Inc., Chicago, Ill.
No Drawing. Continuation-in-part of application Ser. No. 441,864, Mar. 22, 1965. This application May 24, 1967, Ser. No. 640,837
Int. Cl. A23l 1/31
U.S. Cl. 99—107                    8 Claims

ABSTRACT OF THE DISCLOSURE

Primal cuts of meat are fabricated from coarse pieces of lean, uncooked, muscle meat weighing at least ¼ pound each. From about 10%–25% by weight of the entire mass to be uniformly blended comprises a fatty meat batter containing from about 40%–60% by weight fat. In addition to the lean meat and batter, a smaller percentage of a polyphosphate salt is incorporated. These ingredients are mixed for at least about eight minutes into a uniform blend. The polyphosphate content improves the bonding together of the chunks of lean, uncooked muscle meat while the fatty batter imparts tenderness and juiciness to the product. The uniformly blended meat mass is formed into a desired shape which may be retained in the frozen condition or which may be freeze dried. Such primal cuts as steaks, chops, roasts and loins may be made in accordance with the invention.

---

This application is a combination-in-part of our prior co-pending application Ser. No. 441,864 filed Mar. 22, 1965, now abandoned.

This invention relates, generally, to innovations and improvements in fabricating bodies of meat having textures similar to those of primal cuts. More specifically, it relates to the fabrication of steaks and chops which can be accurately portion controlled and which may be either held in the frozen condition for periods of several months, or freeze-dried and hermetically sealed, whereupon they may be held at ambient temperatures for prolonged periods until re-hydration prior to consumption.

The term "primal cut" designates hams, shoulders, loins, roasts, steaks, chops and the like. Primal cuts constitute whole, uncooked bodies of meat and are to be distinguished from uncooked ground meat products such as hamburger meat or fresh pork sausage.

Although the nutritional value may be the same, there is a wide difference in texture and eating properties between a primal cut, e.g., a sirloin steak, and the same piece of meat ground into hamburger meat. The present invention pertains to making or fabricating bodies of meat having textures similar to those of primal cuts (e.g., a steak or roast) as distinguished from ground meat (e.g., hamburger).

The present invention satisfies two principal needs or advantages. First, it provides an economical way in which pieces of whole meat which are not in the form of primal cuts can be used and fabricated into primal cuts instead of having to be ground up and put into lower-priced ground meat or sausage products. Second, the invention provides an economical method whereby highly uniform, portion controlled pieces of meat of any desired shape or size may be made having textures similar to those of primal cuts.

The object of the invention generally stated, is the fabrication of uniform bodies of meat having textures similar to those of primal cuts using mainly relatively small pieces of whole, lean, uncooked muscle meat together with a small proportion of meat batter of a nature and quantity sufficient to improve the tenderness and juiciness of the resulting product when cooked and incorporating a small percent of certain polyphosphates for binding purposes.

A further object of the invention is the production of uniformly shaped and weighed bodies of meat having textures similar to those of primal cuts and fabricated from relatively small pieces of lean, uncooked muscle meat.

Another object of the invention is a method whereby pieces of lean, uncooked muscle meat which are too small to constitute primal cuts can be fabricated into bodies of meat which may or may not simulate primal cuts and which will have textures corresponding or similar to those of primal cuts.

Certain other objects of the invention will, in part, be obvious and will in part appear hereinafter.

GENERAL PROCEDURE

Any source or type of whole, uncooked meat may be used in practicing the invention including pork, beef, veal, lamb, chicken, turkey or any combinations thereof. Lean meat of any one of the foregoing types is cut or coarse ground into pieces weighing at least about one-quarter pound each. For example, boneless pork loins may be utilized as a source of lean meat pieces. After the loins have been trimmed to remove backstrap and other fat they may be cut into strips about one inch in cross section and six inches long, or they may be ground through a coarse plate, such as one having 1" to 1½" size openings.

The resulting coarse pieces of lean, uncooked muscle meat, weighing at least about one-quarter pound each, constitute the preponderant ingredient used in practicing the invention. There is added to the main mass of coarse pieces of lean meat from about 10% to about 25% by weight of the entire mass of a finely ground or chopped batter, preferably one containing about 50% fat and 50% lean. Such a batter may be formed by grinding trimmings through a plate ¼" openings or by chopping trimmings in a rotary chopper. There is mixed together enough of (1) the coarse pieces of lean, uncooked muscle meat weighing at least about one-quarter pound each, (2) fine ground or chopped batter and (3) a polyphosphate, so as to provide a mass wherein the batter constitutes a minor but substantial proportion of the mix, e.g., 10 to 25% by weight of the entire mass and the polyphosphate constitutes only a small percentage, e.g., 0.05 to 0.75%.

A mass of the foregoing composition is intimately and uniformly blended for at least about eight minutes, and preferably ten to twelve minutes, there being an improvement in quality upon carrying out approximately the last five minutes of the mixing or blending under vacuum.

After the mixing or blending is completed the mass is then stuffed or filled into forms or casings of desired shape and size and then the shaped bodies of the mixed meat are frozen solid. While the bodies of meat may be kept in the solid frozen form for substantial periods and then thawed and used as such, it will generally be desirable to cut the frozen bodies of meat of uniform cross section into pieces or slices of predetermined thicknesses e.g., one-half to one inch. These individual pieces may then be kept either in the frozen condition then thawed and used like fresh meat, or they may be freeze-dried using known commercial freeze-drying equipment and methods so as to reduce the moisture content thereof to from about 1 to 2%. When the freeze-dried pieces of meat are vacuum sealed in containers affording resistance to oxygen penetration or leakage they may be kept at room temperatures for months without becoming rancid.

VARIATIONS IN THE GENERAL METHOD

Normally, the invention will be practiced using only one type of meat at a time instead of mixtures thereof. In other words, if a pork product is to be made then only pork will be used for forming the coarse pieces of uncooked muscle meat as well as for forming the fatty batter. Likewise, any of the other types or kinds of meat could be used. However, if desired, the coarse pieces of meat may be of one kind and the batter may be of another and if desired mixtures of different types of meat may be used for forming the coarse pieces of lean, uncooked meat.

While the batter preferably has a fat content of approximately 50% fat and a content of 50% lean, these equal proportions may be varied such as between 40 to 60% each. Furthermore, the batter content of the complete mass will usually run from 10% to 25% by weight of the entire mass. Generally speaking, a sufficient amount of the batter should be used so as to noticeably improve the tenderness and juiciness of the final product over what it would be if such batter was not used. On the other hand, the upper limit of batter will usually be determined by the amount which will begin to impair the ability of bodies or pieces of the final product to hold together in one unitary body or piece when thawed out, sliced or cooked.

The content of polyphosphate ranges upwardly from a minimum amount sufficient to improve and enhance the binding together of the pieces of lean meat into one unitary mass which may be formed, sliced, and cooked without falling apart. An excess of polyphosphate is to be avoided since it will impart a bitterness to the product. Various polyphosphates may be used including any of the sodium, potassium or ammonium salts of tripolyphosphoric acid, pyrophosphoric acid or hexametaphosphoric acid. Usually the sodium salt will be employed, e.g., sodium tripolyphosphate, sodium pyrophosphate or sodium hexametaphosphate.

If desired ordinary salt (sodium chloride) up to about 3% by weight may be included but its presence tends to reduce shelf life due to the development of discoloration in the frozen products and of rancidity in the freeze-dried products. Color retention of the product is improved if antioxidant salt (i.e. sodium chloride carrying a small proportion of antioxidant) is used. Suitable antioxidant salts are described in Patent 2,511,804 dated June 13, 1950.

The mixed mass of meat may be stuffed or filled into forms or casings of various shapes including square, rectangular, oval, round, or cross sections corresponding to steaks or chops. Commercial stuffing equipment may be used and the stuffed forms or casings may be removed and frozen in known manner. The frozen bodies of the mixed and blended meat may be sliced and then the slices freeze-dried in known freeze-drying equipment using normal operating procedures.

SPECIFIC EXAMPLES

Example I

Fifty pounds of boneless pork loins ranging from 7 to 9 pounds are trimmed of fat and backstrap gristle and then cut into strips approximately one inch by one inch in cross section and approximately six inches long. If desired instead of being cut into strips as mentioned the trimmed loins may be chilled and then ground through a plate with 1½ inch openings. In either case the pieces or chunks of lean whole meat will weigh at least about one-quarter pound each. About 12 pounds of loin trim which is about 50% fat and 50% lean is ground through a plate with ¼ inch openings and this ground trim or batter is added to the 50 pounds of coarse lean chunks or pieces along with 0.35 pound of sodium tripolyphosphate. The resultant mass is mixed or blended in a suitable mixer such as a Buffalo Mixer for about 12 minutes. During the last 5 minutes a vacuum is drawn on the closed mixer. The mass is removed from the mixer and stuffed into pork loin-shaped forms containing approximately 10 pounds each. Each form is then taken and frozen at −20° F. until solid. The bodies are removed from the forms and sawed into slices (i.e., chops) approximately ½ inch thick without thawing. These slices are then freeze-dried at 500 microns pressure and at 115° F. platen temperature (radiant heat) down to a moisture content of 1 to 2%. Usually it will take about 13 to 15 hours to accomplish the freeze-drying. The freeze-dried prefabricated pork chops are then vacuum packaged in either hermetically sealed cans or Saran coated cellophane-polyethylene laminated pouches. The cans or pouches may be stored at room temperature for several months without the product becoming rancid or discoloring.

The fabricated pork chops that are obtained either upon thawing the frozen chops or upon re-hydrating the freeze-dried chops, on cooking compare favorably to cooked fresh pork chops. The fabricated chops hold together well and cut like cooked fresh pork chops.

If maximum shelf life is not required, 0.93 pound of either ordinary salt or of antioxidant salt may be added along with the sodium tripolyphosphate in the foregoing example.

Example II

Boneless beef round is trimmed to remove fat and then cut into lean pieces approximately one inch by one inch in cross section and six inches long. Beef trimmings containing approximately 50% fat are ground through a plate having ¼ inch openings. To 50 pounds of the lean strips or pieces there is added 17 pounds of the ground trimmings containing approximately 50% fat and 0.34 pound of sodium tripolyphosphate. This mass is then mixed and blended together for 15 minutes with the last 5 minutes being under vacuum. The blended mass is then stuffed into a 4½ inch fibrous casing and frozen at −20° F. When frozen solid the casing was removed and the body sawed into ½ inch thick slices (i.e. steaks). These slices were freeze-dried and packaged as described above in Example I.

If maximum shelf life is not required, 1.0 pound of either ordinary salt or of antioxidant salt may be added along with the sodium tripolyphosphate in the foregoing example.

Example III

A choice veal hindsaddle is boned and trimmed to about 90% lean. Outside surfaces and gristle are removed and the meat is cut into strips approximately 1 inch by 1 inch in cross section and approximately 6 inches long. 8½ pounds of trimmings ground through a plate with ¼ inch openings and 0.2 pound of potassium hexametaphosphate are thoroughly blended for 15 minutes with 24¾ pounds of the lean chunks. The resultant mass is then stuffed into fibrous casings inserted in a chop form and frozen at −20° F. On removal the frozen meat is sawed into ½ inch thick slices which are packaged in Cryovac film and stored at 0° F. until ready for use.

If maximum shelf life is not required, 0.5 pound of either ordinary salt or of antioxidant salt may be added along with the potassium hexametaphosphate in the foregoing example.

Example IV

Lamb legs and loins are boned and trimmed to about 90% lean. Outside surfaces and gristle are trimmed. The trimmings (except outside trim) are ground through a plate having ¼ inch openings while the lean meat is ground through a plate with 1½ inch openings. 6 pounds of the ground trim and 0.12 pound of sodium hexametaphosphate are added to 17.5 pounds of the lean meat and the mass is mixed and blended together for 12 minutes with the last 5 minutes of blending being under vacuum. The blended mixture is stuffed into a casing lined, chop shaped form and frozen at —20° F. The frozen meat is removed from the form and sawed into ½ inch slices. The slices were packaged in Cryovac film and stored at 0° F.

If maximum shelf life is not required, 0.35 pound of ordinary salt or of antioxidant salt may be added along with the sodium hexametaphosphate in the foregoing example.

DISCUSSION

It has been determined by experiment that if the fine ground fatty trimmings or batter is omitted or reduced to a negligible amount in carrying out the foregoing examples that the resultant product will be tough and dry, although edible and nutritious. The presence of approximately 10% by weight of the total mass of the fine ground fatty meat or batter is required to impart a desirable amount of tenderness and juiciness.

It has also been determined that if the polyphosphate is omitted from the foregoing examples the shaped masses of meat, either sliced or unsliced, will not properly adhere together but will break-up on cooking.

It has also been ascertained that if any substantial content of ordinary salt (NaCl) is present, e.g. 0.5% or more, in the absence of the polyphosphate the product in the frozen condition tends to become discolored after a few days and the brown discoloration becomes rapidly more extensive and worse as the days pass. For example, the discoloration will show up clearly within 10 to 15 days and it will have progressed to more than 50% of the surface in 50 to 60 days while the product is held in the frozen condition.

In addition to causing discoloration of the product when held in the frozen condition, the presence of any substantial amount of ordinary salt in the absence of the polyphosphate will permit the freeze-dried products to become rancid in a short time and interfere with the re-hydration thereof. On the other hand, the polyphosphates neither induce discoloration to the frozen held products nor adversely affect the eating qualities of the freeze-dried product, but do facilitate the re-hydration thereof.

We claim:

1. The method of making uniform bodies of meat having texture similar to that of primal cuts, which comprises: mixing substantially simultaneously and for at least about 8 minutes into a uniform blend a meat mass which consists essentially of a preponderant amount of coarse pieces of lean uncooked muscle meat weighing at least about one-quarter pound each, a minor amount of fatty meat batter, and a small percentage of polyphosphate, the batter being of a nature and in an amount sufficient to improve the tenderness and juiciness of the product when cooked without preventing the bonding of said pieces of lean uncooked muscle meat, and the amount of polyphosphate being sufficient to improve said bonding without imparting objectionable bitterness to the product; forming the uniformly blended meat mass into at least one body having a predetermined cross section thereby producing a product having a texture similar to that of primal cuts, and freezing each such body.

2. The method of claim 1 wherein said fatty meat batter contains from about 40 to 60% by weight of fat and constitutes between about 10 to about 25% by weight of the entire meat mass.

3. The method of claim 1 wherein sodium chloride is incorporated in an amount up to about 3.0% by weight of the entire meat mass.

4. The method of claim 1 wherein said polyphosphate constitutes between about 0.05 and 0.75% by weight of the entire meat mass.

5. The method of claim 1 wherein the positively charged radical of said polyphosphate is selected from the group consisting of sodium, potassium and ammonium radicals and the negative radical is selected from the group consisting of the tripolyphosphate, pyrophosphate and hexametaphosphate radicals.

6. The method of claim 1 wherein at least about the last 5 minutes of mixing is carried out under vacuum.

7. The method of claim 1 wherein each of said frozen bodies of predetermined cross section is sliced into a plurality of pieces.

8. The method of claim 1 wherein each of said frozen bodies of predetermined cross section is sliced into a plurality of pieces and said pieces are freeze-dried.

References Cited

UNITED STATES PATENTS

| | | | |
|---|---|---|---|
| 2,852,392 | 9/1958 | Huber et al. | 99—108 |
| 2,917,388 | 12/1959 | Sullivan et al. | 99—108UX |
| 3,032,421 | 5/1962 | Buchholz | 99—108X |
| 3,075,843 | 1/1963 | Maas et al. | 99—108UX |
| 3,233,333 | 2/1966 | Oppenheimer | 99—208UX |
| 3,285,753 | 11/1966 | Schwall et al. | 99—107 |

RAYMOND N. JONES, Primary Examiner

J. R. HOFFMAN, Assistant Examiner